(12) United States Patent
Tononishi (10) Patent No.: US 10,333,114 B2
(45) Date of Patent: Jun. 25, 2019

(54) ENERGY STORAGE APPARATUS

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 73 days.

(21) Appl. No.: 15/730,329

(22) Filed: Oct. 11, 2017

(65) Prior Publication Data

US 2018/0102517 A1   Apr. 12, 2018

(30) Foreign Application Priority Data

Oct. 12, 2016   (JP) .................. 2016-201213

(51) Int. Cl.
| | |
|---|---|
| *H01M 2/10* | (2006.01) |
| *H01G 9/008* | (2006.01) |
| *H01M 2/20* | (2006.01) |
| *H01M 10/36* | (2010.01) |
| *H01G 11/78* | (2013.01) |

(52) U.S. Cl.
CPC .......... *H01M 2/1005* (2013.01); *H01G 9/008* (2013.01); *H01G 11/78* (2013.01); *H01M 2/1072* (2013.01); *H01M 2/206* (2013.01); *H01M 10/36* (2013.01); *H01M 2220/10* (2013.01); *H01M 2220/20* (2013.01); *Y02E 60/13* (2013.01)

(58) Field of Classification Search
CPC .. H01M 2/1005; H01M 2/1072; H01M 2/206; H01M 10/36; H01G 11/78; H01G 9/008
See application file for complete search history.

(56) References Cited

U.S. PATENT DOCUMENTS

| | | | |
|---|---|---|---|
| 4,632,888 A | 12/1986 | Kump et al. | |
| 5,415,956 A * | 5/1995 | Ching ................... | H01M 2/043 16/423 |
| 2017/0229687 A1* | 8/2017 | Elison ................. | H01M 2/1005 |

FOREIGN PATENT DOCUMENTS

| | | |
|---|---|---|
| JP | S 57-148771 U | 9/1982 |
| JP | S 60-40961 U | 3/1985 |
| JP | S 62-52850 A | 3/1987 |
| JP | S 62-184669 U | 11/1987 |
| JP | H 04-101361 U | 9/1992 |
| JP | H 10-40895 A | 2/1998 |

* cited by examiner

*Primary Examiner* — Stewart A Fraser
(74) *Attorney, Agent, or Firm* — McGinn IP Law Group, PLLC.

(57) ABSTRACT

An energy storage apparatus includes: an outer case formed of a body, and a lid body which covers an opening of the body; an energy storage device which is accommodated in the outer case; and a handle which is mounted on the lid body. The lid body has a first surface, and a second surface which is disposed adjacently to the first surface. The handle is formed of a handle body extending from one end side toward the other end side, and slide portions which are respectively formed on both end sides of the handle body. The handle body is disposed on the first surface. Slide receiving portions which hold the slide portions in a slidable manner are formed on the second surface.

13 Claims, 6 Drawing Sheets

ENERGY STORAGE APPARATUS

CROSS-REFERENCE TO RELATED APPLICATIONS

This application is based on Japanese Patent Application No. 2016-201213, filed on Oct. 12, 2016, the entire contents of which are hereby incorporated by reference.

FIELD

The present invention relates to an energy storage apparatus.

BACKGROUND

Conventionally, there has been known an energy storage apparatus where recessed portions are formed on upper portions of side surfaces of a container, and both end portions of a transverse member (hereinafter descried as a grip) are attached to the recessed portions in a vertically slidable manner (see JP 62-52850 A, for example).

There has been also known an energy storage apparatus where a handle (a grip) is mounted in a recessed portion formed on an upper surface of a lid in a state where the handle can be pulled out in a curved shape from the recessed portion (see JP 10-40895 A, for example).

However, in the energy storage apparatus disclosed in JP 62-52850 A, the grip is not attached to a lid but is attached to a container side. Accordingly, the grip may not be assembled to the container in advance before energy storage devices are inserted into the container, and thus assembling operability may be poor.

In the energy storage apparatus disclosed in JP 10-40895 A, the grip is configured to be pulled out from the lid in a curved shape and hence, a sufficient space may not be secured between the grip and the lid. Accordingly, it may be difficult to carry the energy storage apparatus by holding the grip well. Particularly, a sliding direction of the grip and a lifting direction are orthogonal to each other and hence, such a configuration may not be applicable to carrying of an energy storage apparatus which is unbalanced in weight.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which has improved assembling operability and includes a grip which can be easily held at the time of carrying the energy storage apparatus.

According to an aspect of the present invention, there is provided an energy storage apparatus which includes: an outer case formed of a body, and a lid body which covers an opening of the body; an energy storage device which is accommodated in the outer case; and a handle which is mounted on the lid body, wherein the lid body has a first surface, and a second surface which is disposed adjacently to the first surface, the handle is formed of a handle body extending from one end side toward the other end side, and slide portions which are respectively formed on both end sides of the handle body, the handle body is disposed on the first surface, and slide receiving portions which hold the slide portions in a slidable manner are formed on the second surface.

BRIEF DESCRIPTION OF DRAWINGS

The foregoing and other features of the present invention will become apparent from the following description and drawings of an illustrative embodiment of the invention in which.

DESCRIPTION OF EMBODIMENTS

According to an aspect of the present invention, there is provided an energy storage apparatus which includes: an outer case formed of a body, and a lid body which covers an opening of the body; an energy storage device which is accommodated in the outer case; and a handle which is mounted on the lid body, wherein the lid body has a first surface, and a second surface which is disposed adjacently to the first surface, the handle is formed of a handle body extending from one end side toward the other end side, and slide portions which are respectively formed on both end sides of the handle body, the handle body is disposed on the first surface, and slide receiving portions which hold the slide portions in a slidable manner are formed on the second surface.

With such a configuration, when a user holds and lifts the handle body, the slide portions slide on the slide receiving portions, and the handle body is separated from the first surface of the lid body. The handle can be mounted on the lid body in advance and hence, the energy storage apparatus exhibits improved assembling operability.

It is preferable that the lid body have a projecting portion on an upper surface thereof, the first surface be formed of an upper surface of the projecting portion, and the second surface be formed of side surfaces of the projecting portion.

With such a configuration, when a user holds and lifts the handle, a direction that the handle is lifted and a moving direction of the slide portion which slides on the slide receiving portion can be made to agree with each other so that a lifting operation can be performed smoothly.

It is preferable that, out of the side surfaces of the projecting portion, the side surface on which the slide receiving portion is formed be positioned inward a side surface of the lid body as viewed in a plan view.

With such a configuration, the handle has no portion which projects from the lid body and hence, the handle is minimally brought into contact with other parts and is damaged at the time of carrying the energy storage apparatus. Further, the handle does not become an obstacle also after the energy storage apparatus is mounted on a vehicle.

It is preferable that the slide receiving portion include a recessed portion which is dented from the upper surface of the lid body toward an inner surface side.

With such a configuration, the slide portion can be held in a slidable manner with a simple configuration. The handle can be easily held while ensuring a sufficient slide amount (stroke) thereof.

It is preferable that the slide portion be formed of a plurality of slide portions which are disposed on at least one end side of the handle body in a spaced-apart manner in a direction orthogonal to a direction that the handle body extends.

With such a configuration, when a user holds the handle and lifts the energy storage apparatus, the energy storage apparatus can be carried in a stable state due to the provision of a plurality of fulcrums.

In this case, it is preferable that the slide portions be disposed at equal distance from the handle body.

With such a configuration, a support state of the energy storage apparatus by the handle by way of the slide portions can be made stable.

It is preferable that the slide portion have a groove, and the slide receiving portion be formed of a pawl portion which is engaged with the groove in a slidable manner.

With such a configuration, by merely making the pawl portion engage with the elongated groove, the handle can be easily mounted on the lid body in a slidable manner. The structure is simple and hence, there is no possibility that a manufacturing cost of the energy storage apparatus is increased.

It is preferable that the slide portions be formed of a first slide portion which is supported by the lid body in a slidable manner; and a second slide portion which is supported by the first slide portion in a slidable manner.

With such a configuration, when a user holds and lifts the handle, it is possible to allow the handle body to have a large moving distance from the lid body. Accordingly, a sufficient gap is formed between the lid body and the handle body and hence, a user can hold the handle firmly at the time of carrying the energy storage apparatus.

It is preferable that the lid body have: a first groove portion which is capable of accommodating the handle body therein on the first surface; and a second groove portion which holds the slide portion in a slidable manner and forms the slide receiving portion on the second surface.

With such a configuration, the handle body can be positioned in the first groove portion and hence, the handle body has no portion which projects from the first surface of the lid body. Further, the slide receiving portion is formed of the second groove portion formed on the second surface and hence, the slide portion also has no portion which projects from the second surface.

It is preferable that the lid body include a third groove portion which is disposed adjacently to the first groove portion on the first surface, and the third groove portion have a width larger than a width of the first groove portion in a direction orthogonal to a longitudinal direction of the handle body as viewed in a plan view of the first surface.

With such a configuration, the handle can be easily held by way of the third groove portion.

It is preferable that a depth of the third groove portion be greater than a depth of the first groove portion.

With such a configuration, a user can easily insert his/her fingers into the third groove portion.

It is preferable that an external terminal project from the upper surface of the lid body, and a projecting amount of the external terminal from the upper surface of the lid body be set equal to or less than a projecting amount of the projecting portion.

With such a configuration, the external terminal is minimally brought into contact with other portions and hence, there is no possibility that a defect such as a deformation of the external terminal occurs.

It is preferable that the lid body have a rectangular shape as viewed in a plan view, and the handle body be disposed along a lateral direction of the lid body.

With such a configuration, compared to a case where the handle body is disposed along a longitudinal direction of the lid body, when a user holds the handle and lifts the handle body, a supporting state of the energy storage apparatus can be made stable in a well-balanced manner.

According to the present invention, the handle is mounted on the lid body and hence, the handle mounting operation can be completed in advance in an assembling step of the energy storage apparatus. Accordingly, the energy storage apparatus exhibits excellent assembling property. The handle is slidably supported by the second surface which is disposed adjacently to the first surface of the lid body and hence, even when the energy storage apparatus has a compact configuration, a user can easily hold the handle.

Hereinafter, an embodiment of the present invention is described with reference to attached drawings. In the description made hereinafter, terms indicative of specific directions and positions (for example, terms including "up", "down", "side", and "end") are used when necessary. However, these terms are used for merely facilitating understanding of the invention with reference to drawings, and the technical scope of the present invention is not limited by meaning of these terms. Further, the description made hereinafter merely shows an example essentially, and does not intend to limit the present invention, products to which the present invention is applied, or its applications. Further, drawings are schematically shown and hence, ratios of respective sizes and the like may differ from actual ratios of sizes and the like.

Figure 1:
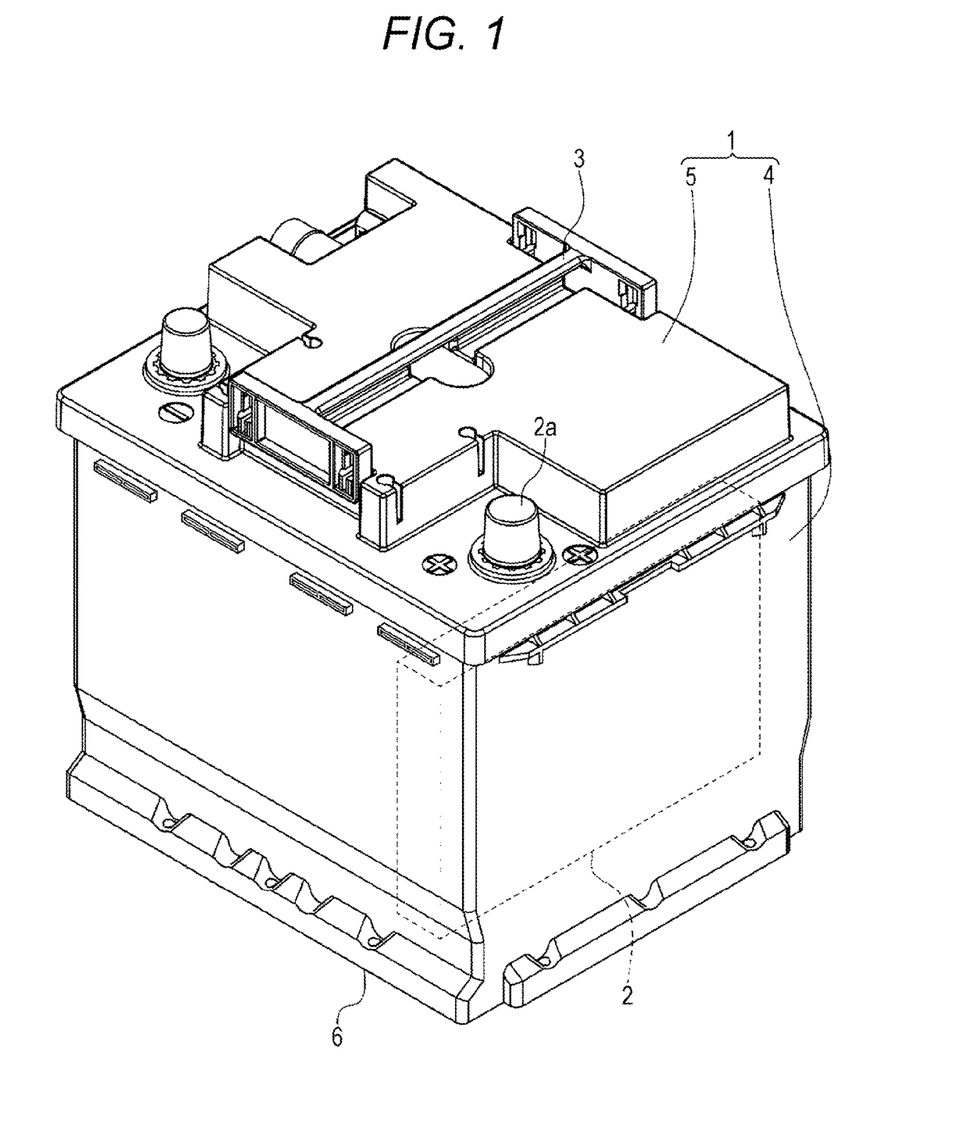
FIG. 1 is a perspective view of an energy storage apparatus according to an embodiment.

FIG. 1 shows an external appearance of an energy storage apparatus according to the embodiment. The energy storage apparatus includes: an outer case 1; a plurality of energy storage devices 2 which are accommodated in the inside of the outer case 1; and a handle 3 which is mounted on the outer case 1.

The outer case 1 is formed of a case body 4 and a lid body 5 which are made of a synthetic resin material.

Figure 2:
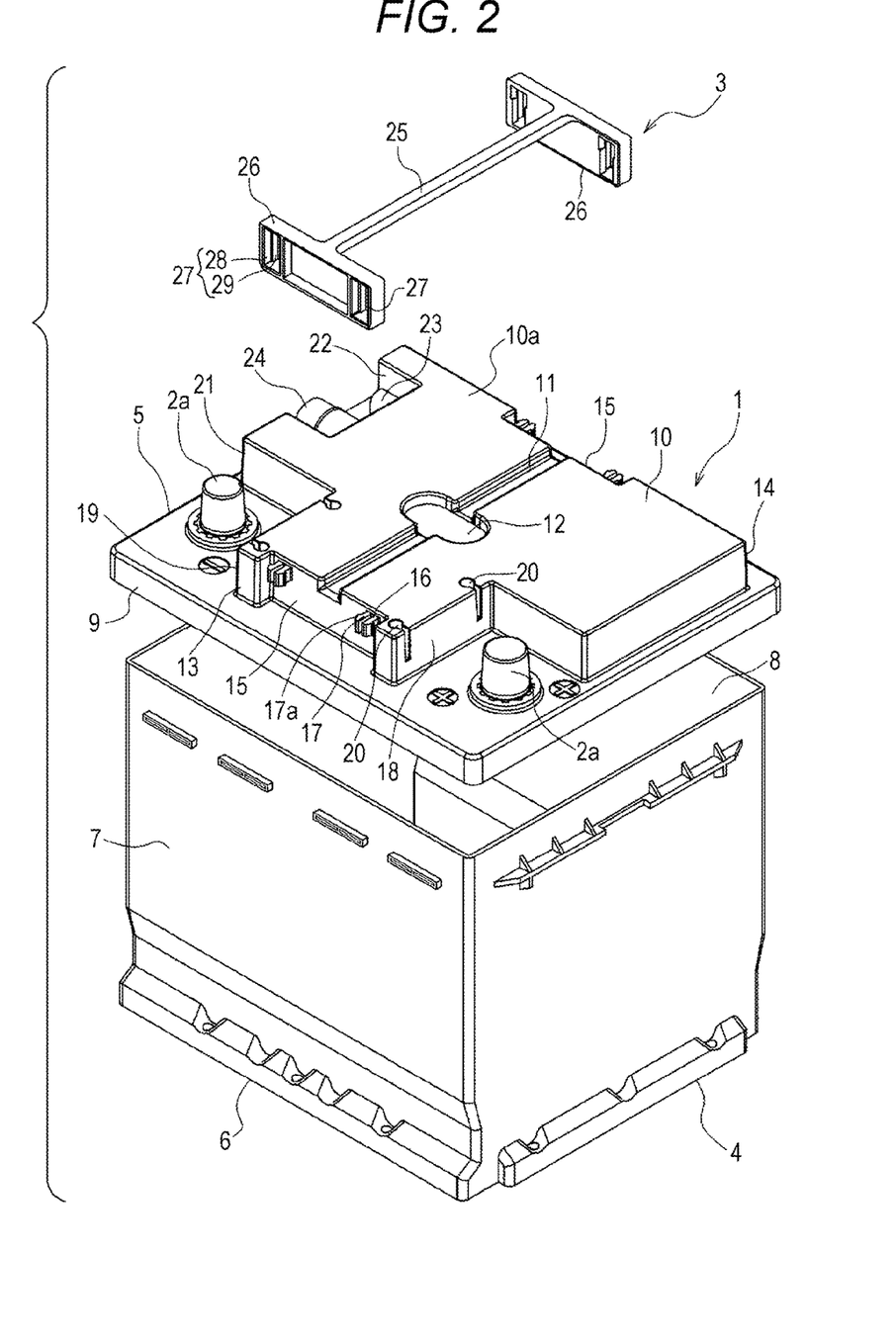
FIG. 2 is an exploded perspective view of a case body, a lid body, and a handle of the energy storage apparatus shown in FIG. 1.

As shown in FIG. 2, the case body 4 has a bottomed cylindrical shape, and is formed of a bottom surface portion 6 having a rectangular shape as viewed in a plan view, and four side surface portions 7 which are raised from four sides of the bottom surface portion 6. An upper opening portion 8 is formed on an upper end portion of the case body 4 by the four side surface portions 7.

The lid body 5 has a rectangular shape as viewed in a plan view, and a frame body 9 extends downward from four sides of the lid body 5. The lid body 5 closes the upper opening portion 8 of the case body 4. On an upper surface of the lid body 5, a projecting portion 10 having an approximately T shape as viewed in a plan view is formed at a portion within an outer edge of the lid body 5.

A first groove portion 11 which divides the projecting portion 10 into two sections is formed on a center portion of an upper surface (corresponding to a "first surface" in claims) of the projecting portion 10. At an intermediate portion of the first groove portion 11, escape recessed portions 12 having a depth slightly larger than a depth of the first groove portion 11 are formed, and both the first groove portion 11 and the escape recessed portions 12 are communicated with each other. The escape recessed portions 12 expand in a semicircular shape as viewed in a plan view toward both sides of the first groove portion 11 from the first groove portion 11.

On a first side surface 13 (corresponding to a "second surface" in claims) which is disposed orthogonal to and adjacent to the upper surface (first surface) of the projecting portion 10 and on a second side surface 14 (corresponding to a "second surface" in claims) positioned on a side opposite to the first side surface 13, second groove portions 15 with which both end portions of the first groove portion 11 are communicated are formed respectively. The second groove portions 15 have sufficiently large widths compared to the width of the first groove portion 11. Locking pawl portions 16 which function as slide receiving portions respectively project from both side portions of a bottom surface (a side surface extending in the vertical direction) of each second groove portion 15. The locking pawl portion 16 is formed of a pair of locking members 17 which projects at a predetermined interval. Each locking member 17 has a locking projection 17a on outer sides of a distal end thereof (on a side opposite to opposedly facing surfaces) respectively. The respective locking members 17 are elastically deformable inwardly (toward an opposedly facing side).

On a third side surface 18 and a fourth side surface 19 which are respectively orthogonal to the first side surface 13 (second surface) of the projecting portion 10, a pair of locking grooves 20 extending in the vertical direction is formed respectively. By making use of the respective locking grooves 20, a cover (not shown) which covers external terminals 2a described later is mounted.

On a fifth side surface 21 which is one of side surfaces orthogonal to the second side surface 14 (second surface) of the projecting portion 10, a recessed portion 22 which is covered by a cover (not shown) is formed. A communication connector 23 and a degassing pipe 24 are disposed in the recessed portion 22 in a projecting manner.

An insertion hole (not shown) is formed in two corner portions on the upper surface of the lid body 5 where the projecting portion 10 is not formed, respectively. Bolts (not shown) respectively project from the insertion holes. The external terminals 2a are fixed by these bolts.

Although not shown, the energy storage device 2 is configured such that separators, a positive electrode, a negative electrode, and a nonaqueous electrolyte are accommodated in the inside of a case having a rectangular parallelepiped shape. The energy storage devices 2 are accommodated in the inside of the outer case 1 such that the plurality of energy storage devices 2 are disposed parallel to each other in a width direction of the energy storage device 2, and the energy storage devices 2 are connected in series or in parallel by bus bars connected to the positive electrodes and the negative electrodes of the energy storage devices 2. Bus bar terminals are connected to a positive electrode side and a negative electrode side of the bus bar respectively. The external terminals 2a are fixed to the respective bus bar terminals by way of bolts.

The handle 3 is made of a synthetic resin material and is formed of; a handle body 25 which extends from one end side to the other end side; and slide portions 26 which are formed on both ends of the handle body 25 respectively. As the configuration of the handle 3, besides the configuration shown in FIG. 2 and FIG. 3, various configurations shown in FIG. 4 to FIG. 9 can be adopted.

Figure 3:
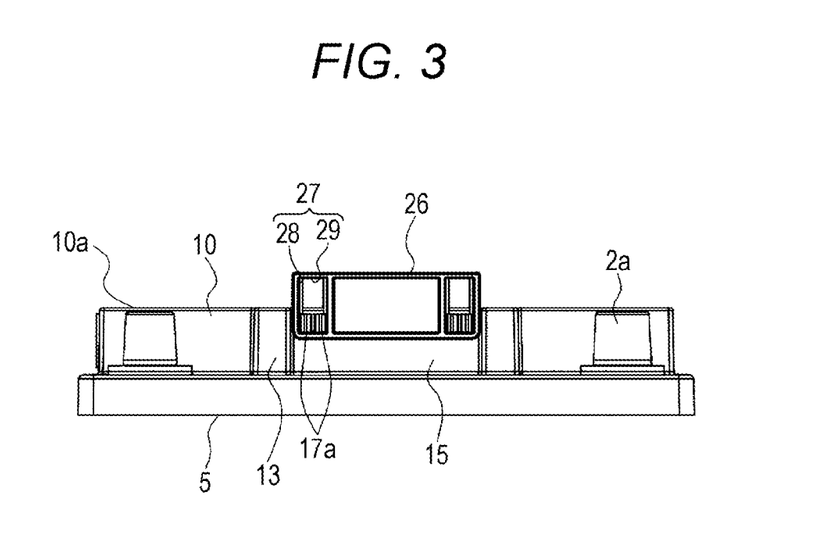
FIG. 3 is a front view showing a state where the handle is assembled to the lid body shown in FIG. 2.

With respect to the handle 3 shown in FIG. 2 and FIG. 3, the handle body 25 has a linear shape extending from one end side to the other end side. A width, a thickness and a length of the handle body 25 are set to values which allow the handle body 25 to be accommodated in the first groove portion 11 formed on the lid body 5. A locking receiving portion 27 is formed on both sides of the slide portion 26 respectively. Each locking receiving portion 27 is formed of a rectangular-shaped locking recessed portion 28 extending in the vertical direction; and a locking hole 29 which is formed at the center of a bottom surface of the locking recessed portion 28. In the locking hole 29, the locking members 17 formed on the projecting portion 10 are inserted while being elastically deformed in an opposedly facing direction. The locking members 17 are returned to an original shape in the locking recessed portion 28 and hence, the locking projections 17a are locked. In this case, the locking members 17 are vertically movable in the locking hole 29 in a state where the locking projections 17a are locked in the locking recessed portion 28. With such a configuration, the handle 3 is supported in a vertically slidable manner with respect to the lid body 5.

Figure 4:
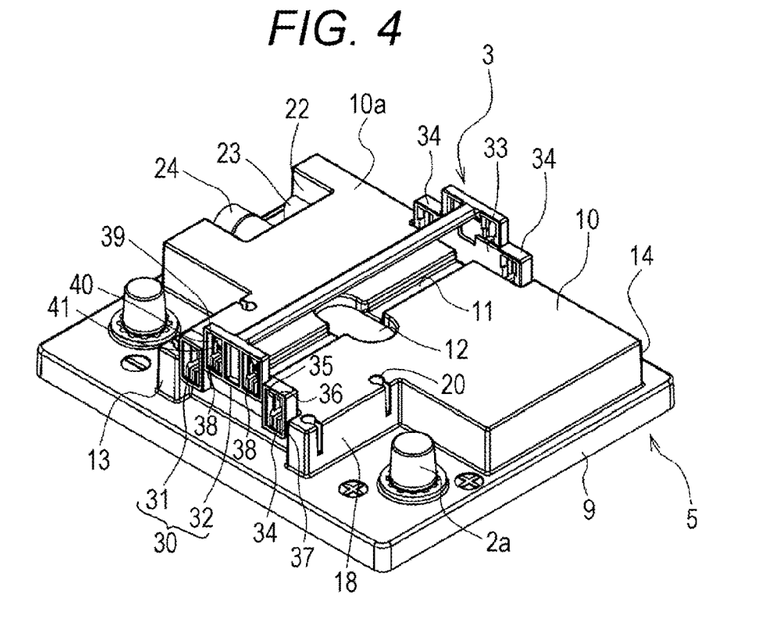
FIG. 4 is a perspective view showing a state where a lid body and a handle according to another embodiment are assembled to each other.

A handle 3 shown in FIG. 4 differs from the handle 3 shown in FIG. 2 with respect to a point that a slide portion 30 has the two-stage structure. Accordingly, in FIG. 4, other members corresponding to the members shown in FIG. 2 are given the same symbols, and their description is omitted.

The slide portion 30 is formed of; a first slide portion 31 which is supported by a lid body 5, and a second slide portion 32 which is supported by the first slide portion 31.

The first slide portion 31 is formed of; a flat plate portion 33; and first locking receiving portions 34 which are respectively formed on both sides of the flat plate portion 33. The first locking receiving portion 34 has substantially the same configuration as the locking receiving portion 27 shown in FIG. 2. A first locking recessed portion 35 and a first locking hole 36 are formed in the first locking receiving portion 34. First locking pawl portions 37 which are formed on the projecting portion 10 and have substantially the same configuration as the locking pawl portions 16 are locked to the first locking recessed portion 35 and the first locking hole 36. With such a configuration, the first slide portion 31 is supported in a vertically slidable manner with respect to the lid body 5. Second locking pawl portion 38 having substantially the same configuration as the locking pawl portion 16 is respectively formed on both sides of an upper portion of the flat plate portion 33.

The second slide portion 32 includes second locking receiving portions 39 on both sides thereof, and is disposed between the first locking receiving portions 34 of the first slide portion 31. The second locking receiving portion 39 has substantially the same configuration as the locking receiving portion 27, and a second locking recessed portion 40 and a second locking hole 41 are formed in the second locking receiving portion 39. The second locking pawl portion 38 formed on the first slide portion 31 is locked to the second locking recessed portion 40 and the second locking hole 41. With such a configuration, the second slide portion 32 is supported in a vertically slidable manner with respect to the first slide portion 31.

In this manner, the two-stage structure is adopted where the first slide portions 31 are supported in a vertically slidable manner with respect to the projecting portion 10 of the lid body 5, and the second slide portions 32 are supported in a vertically slidable manner with respect to the first slide portions 31. Accordingly, a pullout amount of the handle 3 from the lid body 5 is increased and hence, the handle 3 can be easily held.

Figure 5:
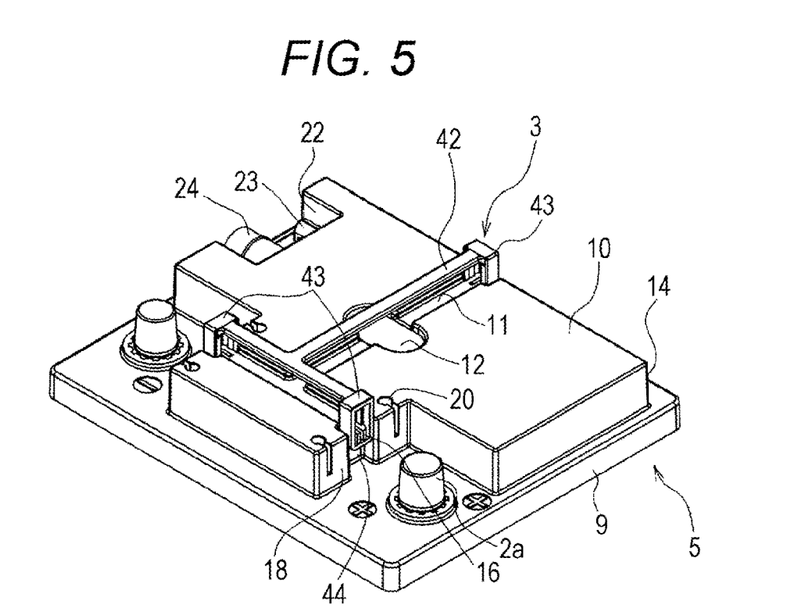
FIG. 5 is a perspective view showing a state where a lid body and a handle according to another embodiment are assembled to each other.

The handle 3 shown in FIG. 5 includes a handle body 42 having a T shape. Slide portions 43 are respectively formed on three end portions of the handle body 42. Each slide portion 43 is formed of only one of the locking receiving portions 27 of the slide portion 26 shown in FIG. 2. Corresponding to such a configuration, a second groove portion 44 extending in the vertical direction is formed on a second side surface 14 (second surface), a third side surface 18 (second surface) and a fourth side surface 19 (second surface) of a projecting portion 10 of a lid body 5 respectively, and a locking pawl portion 16 is formed on these side surfaces respectively on a one-by-one basis.

Figure 6:
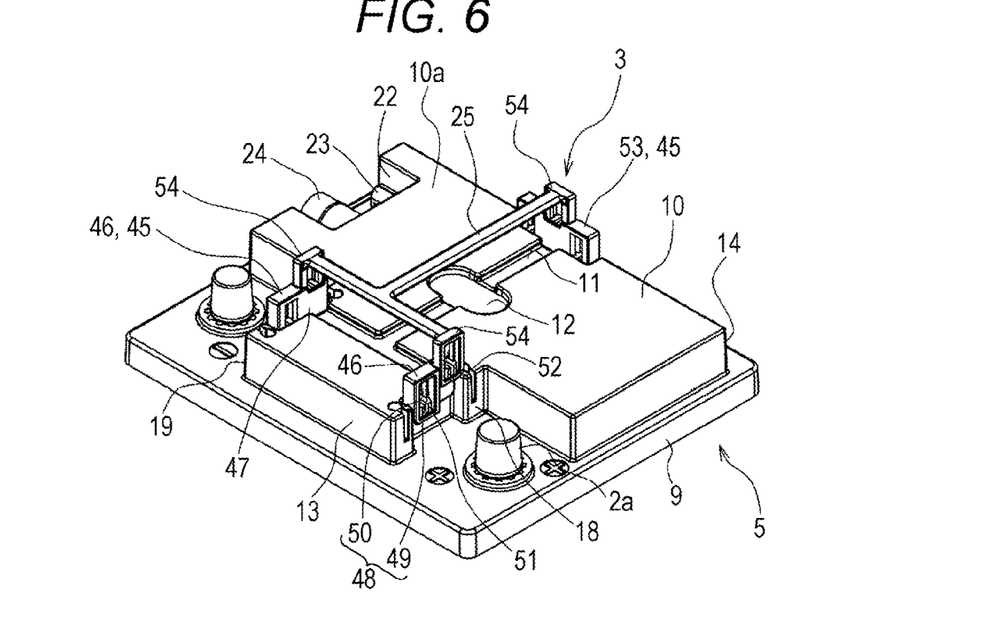
FIG. 6 is a perspective view showing a state where a lid body and a handle according to another embodiment are assembled to each other.

A handle 3 shown in FIG. 6 differs from the handle 3 shown in FIG. 5 with respect to a point that the handle 3 shown in FIG. 6 includes a slide portion 45 having a two-stage structure. Accordingly, in FIG. 6, other members corresponding to the members shown in FIG. 5 are given the same symbols, and their description is omitted.

First slide portions 46 are respectively disposed on a third side surface 18 (second surface) and a fourth side surface 19 (second surface) of the projecting portion 10. In the first slide portion 46, a locking receiving portion 48 is formed on a half of one-side surface of a flat plate portion 47 on a first side surface 13 side. Similarly to the locking receiving portion 27, the locking receiving portion 48 has a locking recessed portion 49 and a locking hole 50, and locking pawl portions 51 which are respectively formed on the third side surface 18 and the fourth side surface 19 are locked to the locking receiving portions 48 respectively. With such a configuration, the first slide portions 46 are supported in a vertically slidable manner with respect to the lid body 5. Further, a locking pawl portion 52 is formed on a remaining half of one-side surface of the flat plate portion 47.

A second slide portion 53 is formed on a second side surface 14 (second surface) of the projecting portion 10. The second slide portion 53 has substantially the same configuration as the first locking receiving portions 34 shown in FIG. 4. The handle 3 shown in FIG. 6 includes a handle body 25 having a T shape substantially similar to the handle body 42 shown in FIG. 5, and a third slide portion 54 is formed on respective end portions of the handle body 25 respectively. Each of the third slide portions 54 has substantially the same configuration as the slide portion 43 shown in FIG. 5.

Figure 7:
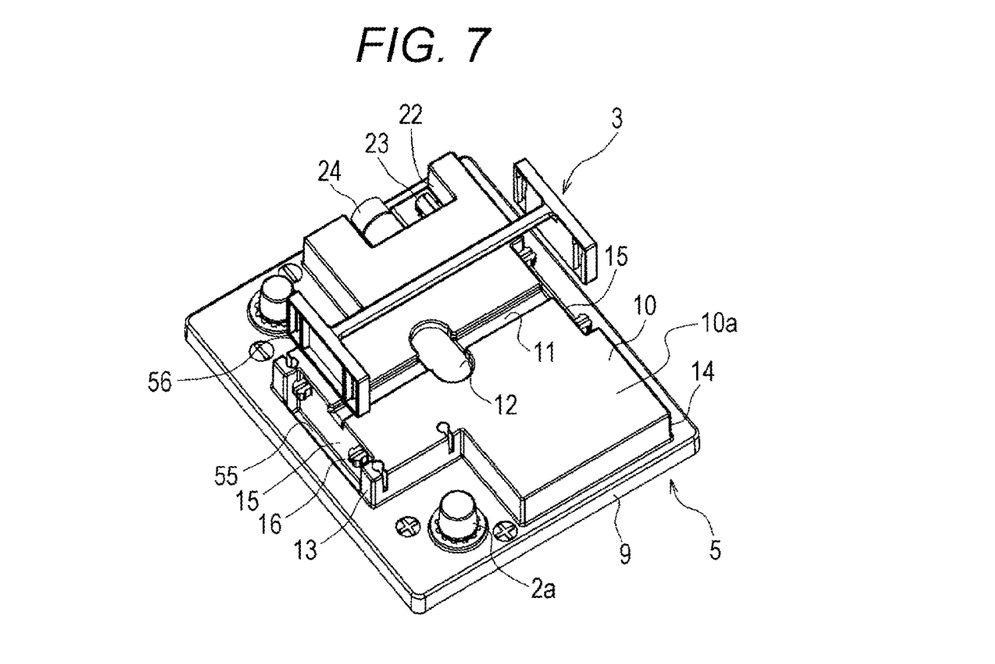
FIG. 7 is an exploded perspective view of a lid body and a handle according to another embodiment.

A handle 3 shown in FIG. 7 differs from the handle 3 shown in FIG. 2 with respect to a point that, in the handle 3 shown in FIG. 7, to increase a slide amount of the handle 3, a recessed portion which extends downward from an upper surface of a lid body 5 and projects beyond a lower surface of the lid body 5 is formed. Accordingly, in FIG. 7, other members corresponding to the members shown in FIG. 2 are given the same symbols, and their description is omitted.

On the lid body 5, guide recessed portions 55 are formed. The guide recessed portions 55 project from a lower surface side of the lid body 5 along second groove portions 15 which are formed on a first side surface 13 (second surface) and a second side surface 14 (second surface) of a projecting portion 10 respectively. That is, the guide recessed portions 55 are formed such that the guide recessed portions 55 are dented from the upper surface of the lid body 5 toward an inner surface side. With respect to slide portions 56, a size of the slide portion 56 in a vertical direction is set larger than a size of the slide portion 26 shown in FIG. 2 in a vertical direction by an amount of a depth of the guide recessed portion 55. With such a configuration, when a user holds the handle body 25 and lifts the handle 3 with respect to the lid body 5, a stroke of the handle 3 can be increased by an amount of an increase of a depth of the guide recessed portion 55 and hence, a sufficient space can be ensured between the upper surface 10a (first surface) of the projecting portion 10 and a lower surface of the handle body 25.

Figure 8:
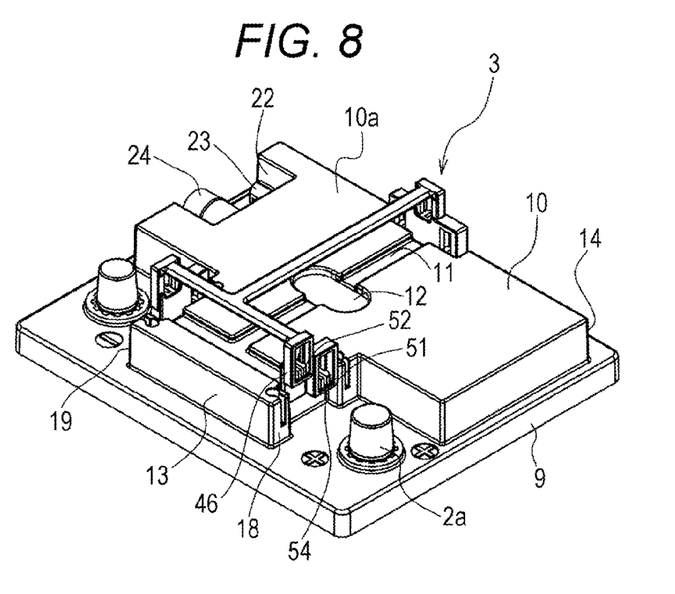
FIG. 8 is a perspective view showing a state where a lid body and a handle according to another embodiment are assembled to each other.

A handle 3 shown in FIG. 8 differs from the handle 3 shown in FIG. 6 with respect to a point that a positional relationship between locking receiving portions 48 of first slide portions 46 and third slide portions 54 shown in FIG. 8 is set opposite to a positional relationship between the locking receiving portions 48 of first slide portions 46 and the third slide portions 54 shown in FIG. 6. Accordingly, in FIG. 8, other members corresponding to the members shown in FIG. 6 are given the same symbols, and their description is omitted.

The first slide portions 46 are disposed on a first side surface 13 side, and the third slide portions 54 are disposed on a side opposite to the first side surface 13 in FIG. 8. With such a configuration, when a user holds a handle body 25 and lifts the handle 3, the first slide portions 46 which form fulcrums can be disposed at a position close to a first side surface 13 side and remote from the second side surface 14.

Figure 9:
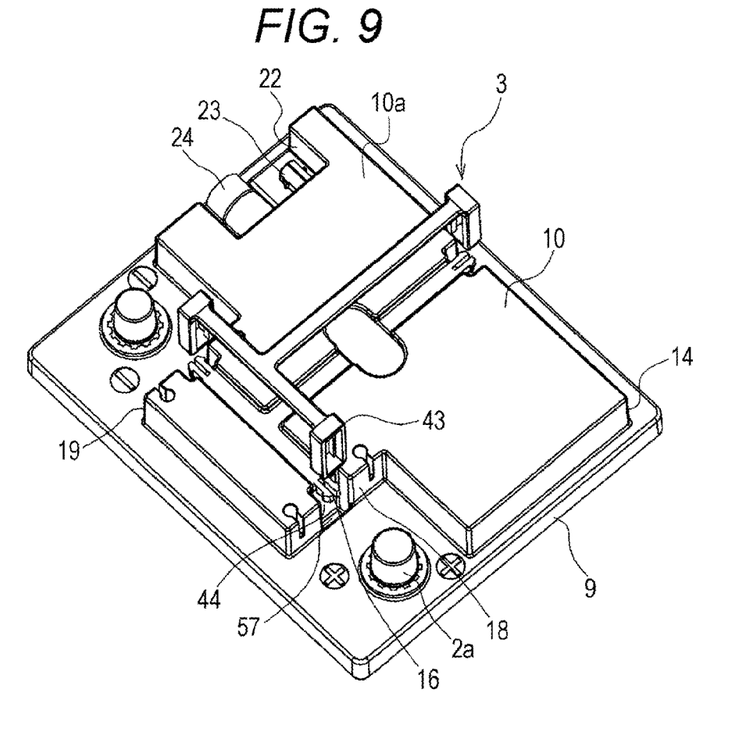
FIG. 9 is an exploded perspective view of a lid body and a handle according to another embodiment.

A handle 3 shown in FIG. 9 differs from the handle 3 shown in FIG. 5 with respect to a point that a recessed portion substantially similar to the recessed portion shown in FIG. 7 is formed for increasing a slide amount of the handle 3. Accordingly, in FIG. 9, other members corresponding to the members shown in FIG. 5 are given the same symbols, and their description is omitted.

Guide recessed portions 57 which project from a lower surface side along second groove portions 44 are respectively formed on a lid body 5. Also with such a configuration, the handle 3 can have a sufficiently long stroke similar to the handle 3 shown in FIG. 7.

With the handle 3 having the above-mentioned configuration, in mounting an energy storage apparatus on a vehicle or in removing the energy storage apparatus from the vehicle, the energy storage apparatus can be easily carried by pulling out the handle 3 from the lid body 5 and holding the handle 3. A pullout position of the handle 3 is located at a position remote from a direction at which a gas is discharged from the degassing pipe 24 and hence, it is possible to prevent hot air from being blown off to a hand of a user in a handle holding state.

According to the handle 3 shown in FIG. 2 and FIG. 3, a user inserts his/her fingers between the handle 3 and the projecting portion 10 through the escape recessed portions 12 (referred to as "third groove portions" by taking into account the association of the escape recessed portions 12 with the first groove portion 11 and the second groove portions 15), holds the handle body 25 and can lift the handle 3. In a plan view of the lid body 5, a width of the escape recessed portion 12 in a direction orthogonal to the longitudinal direction of the handle body 25 is set larger than a width of the first groove portion 11. A depth of the escape recessed portion 12 may be set equal to a depth of the first groove portion 11, or may preferably be set deeper than the depth of the first groove portion 11. With such a configuration, a user can easily insert his/her fingers into the escape recessed portions 12. In the whole embodiment, the escape recessed portions 12 are respectively formed on both sides of the handle body 25 with the handle body 25 sandwiched by and between the escape recessed portions 12. However, the escape recessed portion 12 may be formed on only one side of the handle body 25. Further, in a plan view of the projecting portion 10, the escape recessed portion 12 is formed into a semicircular shape in the whole embodiment. However, the escape recessed portion 12 may be formed into various shapes such as a rectangular shape.

When a user lifts the handle body 25, the slide portions 26 on both end portions of the handle body 25 slidably move upward along the second groove portions 15 respectively formed on the first side surface 13 and the second side surface 14. That is, a lifting direction of the handle body 25 and a sliding direction of the slide portions 26 agree with each other so that a lifting operation can be performed smoothly. The positions where the handle 3 is supported are the locking receiving portions 27 which are formed on both sides of each of the slide portions 26 which are disposed on both end portions of the handle body 25. That is, the handle 3 is supported at four positions. Accordingly, even when the position of the center of gravity of the energy storage devices 2 accommodated in the outer case 1 is displaced, a state where a user holds and lifts the handle 3 can be maintained stable.

According to the handle 3 shown in FIG. 4, different from the slide portion 26 shown in FIG. 2, the slide portion 30 has the two-stage structure and hence, a stroke of the handle 3 at the time of holding and lifting the handle body 25 can be sufficiently increased compared to a case where the slide portion 26 has the one-stage structure as shown in FIG. 2. With such a configuration, a sufficient gap can be formed between the upper surface of the projecting portion 10 and the lower surface of the handle body 25. That is, in addition to the advantageous effect acquired by the configuration shown in FIG. 2, it is also possible to acquire a following advantageous effect. That is, a user can easily insert his fingers into the gap and, in a state where the user holds the handle body 25, there is no possibility that his/her fingers are brought into contact with the upper surface of the projecting portion 10. Accordingly, the user minimally feels a pain in his/her fingers at the time of carrying the energy storage apparatus.

According to the handle 3 shown in FIG. 5, the positions where the handle 3 is supported can be distributed to three locations so that a state where the user holds the handle body 25 and lifts the handle 3 can be maintained stable. Each support position can be formed of one set of the locking receiving portion 27 and the locking pawl portion 16 and hence, the support structure can be simplified whereby a defect in operation minimally occurs.

According to the handle 3 shown in FIG. 6, the handle 3 can acquire a sufficient stroke with the stable support structure where the handle 3 is supported at three locations. Accordingly, while stably maintaining a state where a user holds and lifts the handle body 25, the user can easily insert his/her fingers into the gap, and the user minimally feels a pain in his/her fingers in a state where the user holds the handle body 25.

According to the handle 3 shown in FIG. 7, by adopting the simple configuration where the guide recessed portions 55 are merely formed on the lid body 5, it is possible to make the complicated configuration such as the previously mentioned two-stage structure on a handle side unnecessary. With such a configuration, the user can easily insert his/her fingers into the gap while suppressing a manufacturing cost and allowing the handle 3 to have a sufficient stroke and, at the same time, a holding state of the handle 3 can be maintained stable.

According to the handle 3 shown in FIG. 8, support positions can be spaced apart from each other compared to the configuration shown in FIG. 6 and, further, a support state can be maintained stable. More specifically, a portion of the handle 3 which corresponds to a longitudinal rod portion of a shape of "T" out of the T-shaped handle body 25 and is connected to the third slide portions 54 can be made longer than a portion of the handle 3 according to the embodiment shown in FIG. 6. With such a configuration, a user can easily hold the handle body 25 with his hand.

According to the handle 3 described in FIG. 9, unlike the structure on a handle 3 side shown in FIG. 6 or FIG. 8 which is complicated, it is possible to increase a stroke in a vertical direction with the simple configuration where the guide recessed portions 57 are merely formed on a lid body 5 side.

The present invention is not limited to the configurations described in the above-mentioned embodiment, and various modifications are conceivable.

In the above-mentioned embodiment, the handle body 25 has a linear shape or a T-shape. However, the handle body 25 may be configured to be further branched in a shape such as an H shape. With such a configuration, the number of positions where the handle 3 is supported can be further increased so that the energy storage apparatus can be carried in a stable state.

In the above-mentioned embodiment, the slide portion 26 has the one-stage or two-stage structure, the slide portion 26 can have the three or more stage structure. With such a configuration, a stroke of the handle 3 in a vertical direction can be further increased. Accordingly, the energy storage apparatus can be carried easily by holding the handle more firmly.

What is claimed is:

1. An energy storage apparatus comprising:
an outer case formed of a body, and a lid body which covers an opening of the body;
an energy storage device which is accommodated in the outer case; and
a handle which is mounted on the lid body,
wherein the lid body has a first surface, and a second surface which is disposed adjacently to the first surface,
the handle is formed of a handle body extending from one end side toward the other end side, and slide portions which are respectively formed on both end sides of the handle body,
the handle body is disposed on the first surface, and
slide receiving portions which hold the slide portions in a slidable manner are formed on the second surface.

2. The energy storage apparatus according to claim 1, wherein the lid body has a projecting portion on an upper surface thereof, the first surface is formed of an upper surface of the projecting portion, and the second surface is formed of side surfaces of the projecting portion.

3. The energy storage apparatus according to claim 2, wherein out of the side surfaces of the projecting portion, the side surface on which the slide receiving portion is formed is positioned inward a side surface of the lid body as viewed in a plan view.

4. The energy storage apparatus according to claim 2, wherein an external terminal projects from the upper surface of the lid body, and a projecting amount of the external terminal from the upper surface of the lid body is set equal to or less than a projecting amount of the projecting portion.

5. The energy storage apparatus according to claim 1, wherein the slide receiving portion includes a recessed portion which is dented from the upper surface of the lid body toward an inner surface side.

6. The energy storage apparatus according to claim 1, wherein the slide portion is formed of a plurality of slide portions which are disposed on at least one end side of the handle body in a spaced-apart manner in a direction orthogonal to a direction that the handle body extends.

7. The energy storage apparatus according to claim 6, wherein the slide portions are disposed at equal distance from the handle body.

8. The energy storage apparatus according to claim 1, wherein the slide portion has a groove, and the slide receiving portion is formed of a pawl portion which is engaged with the groove in a slidable manner.

9. The energy storage apparatus according to claim 1, wherein the slide portions are formed of a first slide portion which is supported by the lid body in a slidable manner; and a second slide portion which is supported by the first slide portion in a slidable manner.

10. The energy storage apparatus according to claim 1, wherein the lid body has: a first groove portion which is capable of accommodating the handle body therein on the first surface; and a second groove portion which holds the slide portion in a slidable manner and forms the slide receiving portion on the second surface.

11. The energy storage apparatus according to claim 10, wherein the lid body includes a third groove portion which is disposed adjacently to the first groove portion on the first surface, and the third groove portion has a width larger than a width of the first groove portion in a direction orthogonal to a longitudinal direction of the handle body as viewed in a plan view of the first surface.

12. The energy storage apparatus according to claim 11, wherein a depth of the third groove portion is greater than a depth of the first groove portion.

13. The energy storage apparatus according to claim 1, wherein the lid body has a rectangular shape as viewed in a plan view, and the handle body is disposed along a lateral direction of the lid body.

* * * * *